United States Patent [19]

Yamagata et al.

[11] Patent Number: 5,032,290
[45] Date of Patent: Jul. 16, 1991

[54] METHOD AND SYSTEM OF WATER SUPPLY FOR A BUILDING CONSTRUCTION

[75] Inventors: Kazushi Yamagata, Chiba; Tatsunari Terashima, Tokyo, both of Japan

[73] Assignee: Nihonkensetsu Kogyo Co., Ltd., Tokyo, Japan

[21] Appl. No.: 404,831

[22] Filed: Sep. 8, 1989

[30] Foreign Application Priority Data

Sep. 8, 1988 [JP] Japan .................................. 63-224805
Sep. 9, 1988 [JP] Japan .................................. 63-224804
Sep. 9, 1988 [JP] Japan .................................. 63-224806

[51] Int. Cl.⁵ .......................... C02F 1/30; B01D 24/02
[52] U.S. Cl. .................................. 210/747; 210/748; 210/790; 210/805; 210/807; 210/167; 210/172; 210/266; 210/290; 137/357; 137/563
[58] Field of Search ............ 137/357, 563, 561 A, 137/571; 210/153, 167, 172, 195.1, 254, 257.1, 266, 290, 434, 503, 747, 748, 790, 805, 806, 807

[56] References Cited

U.S. PATENT DOCUMENTS

| | | | |
|---|---|---|---|
| 812,243 | 2/1906 | Stahl | 210/172 |
| 920,558 | 5/1909 | Fleming | 137/563 |
| 920,559 | 5/1909 | Fleming | 137/563 |
| 1,026,236 | 5/1912 | Ahrens | 137/357 |
| 1,560,679 | 11/1925 | Elliot | 137/357 |
| 3,448,759 | 6/1969 | Peerman | 137/357 |
| 3,870,228 | 3/1975 | Moseley, Jr. | 137/563 |
| 4,501,661 | 2/1985 | Karasawa | 210/266 |
| 4,578,188 | 3/1986 | Cousino | 137/561 A |

FOREIGN PATENT DOCUMENTS

10504 of 1905 United Kingdom .

Primary Examiner—Stanley Silverman
Assistant Examiner—Christopher Upton
Attorney, Agent, or Firm—Weiser & Stapler

[57] ABSTRACT

A method of water supply for a building construction capable of preventing the deterioration of the water quality even when the water is not extracted over an extended period of time. The method includes the steps of: receiving water externally supplied to the building construction by a receiving reservoir; reserving the water received by the receiving reservoir by an upper reservoir located above the receiving reservoir; supplying the water through the water supply pipes leading the water from the upper reservoir to individual faucets located between the receiving reservoir and the upper reservoir from which the water can be extracted; and circulating the water in the water supply pipes by returning the water back to one of the receiving reservoir and the upper reservoir. The system performing this method is also disclosed.

6 Claims, 11 Drawing Sheets

METHOD AND SYSTEM OF WATER SUPPLY FOR A BUILDING CONSTRUCTION

BACKGROUND OF THE INVENTION

1. Field of the Invention

The present invention relates to a method and a system of supplying water in a building construction incorporating a lower reservoir for receiving the external water supply and an upper reservoir for distributing the water in the building construction.

2. Description of the Background Art

Figure 1:
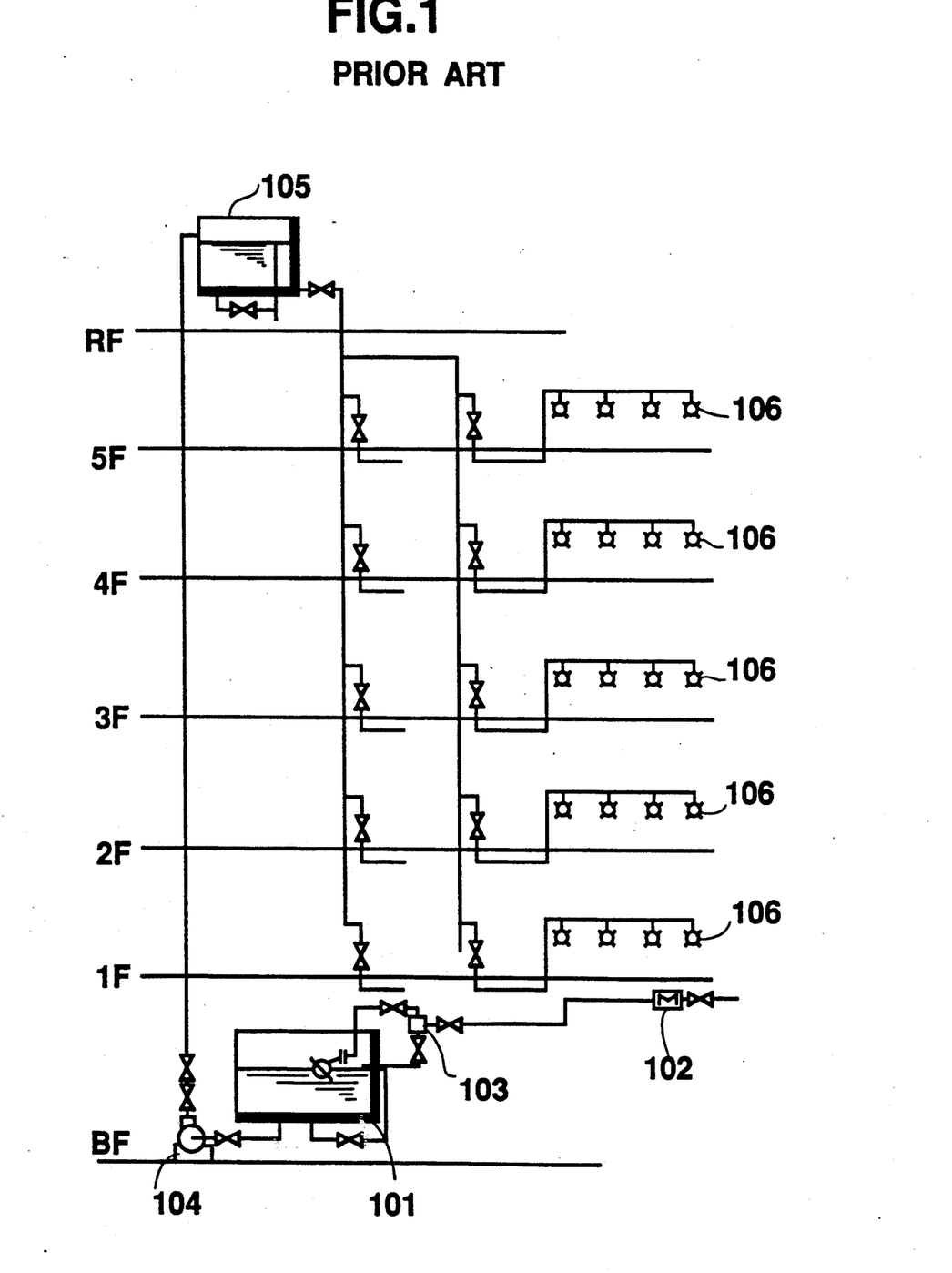
FIG. 1 is a schematic diagram of a conventional water supply system for a building construction.

Conventionally, a water supply system in a building construction has a structure such as that shown in FIG. 1.

In this conventional water supply system in a building construction, there is a receiving reservoir 101 for receiving water from an external water supply, which is usually located at a basement floor. The water from the external water supply will be deposited into the receiving reservoir through a water gauge 102 and a water level valve 103. In addition, there is also an upper reservoir 105 usually at a roof floor into which the water deposited in the receiving reservoir 101 will be pumped by the water pump 104 and reserved. The water reserved in the upper reservoir 105 will be led by gravity to individual water faucets 106 provided at each floor, from which the water can be extracted.

However, in such a conventional water supply system in a building construction, when the water is not extracted from the individual water faucets 106 over an extended period of time, such as a circumstance encountered by a school building during a recess period, the water will be maintained completely still in the system, so that the quality of water will be deteriorated as a consequence of the de-activation of the water and the rusting of the pipes.

SUMMARY OF THE INVENTION

It is therefore an object of the present invention to provide a method and a system of water supply for a building construction capable of preventing the deterioration of the water quality even when the water is not extracted over an extended period of time.

According to one aspect of the present invention there is provided a system of water supply for a building construction, comprising: a receiving reservoir for receiving water externally supplied to the building construction; an upper reservoir located above the receiving reservoir for reserving the water received by the receiving reservoir; water supply pipes leading the water from the upper reservoir to individual faucets located between the receiving reservoir and the upper reservoir from which the water can be extracted; and means for circulating the water in the water supply pipes by returning the water back to one of the receiving reservoir and the upper reservoir.

According to another object of the present invention there is provided a method of water supply for a building construction, comprising the steps of: receiving water externally supplied to the building construction by a receiving reservoir; reserving the water received by the receiving reservoir by an upper reservoir located above the receiving reservoir; supplying the water through the water supply pipes leading the water from the upper reservoir to individual faucets located between the receiving reservoir and the upper reservoir from which the water can be extracted; and circulating the water in the water supply pipes by returning the water back to one of the receiving reservoir and the upper reservoir.

Other features and advantages of the present invention will become apparent from the following description taken in conjunction with the accompanying drawings.

DETAILED DESCRIPTION OF THE PREFERRED EMBODIMENTS

Figure 2:
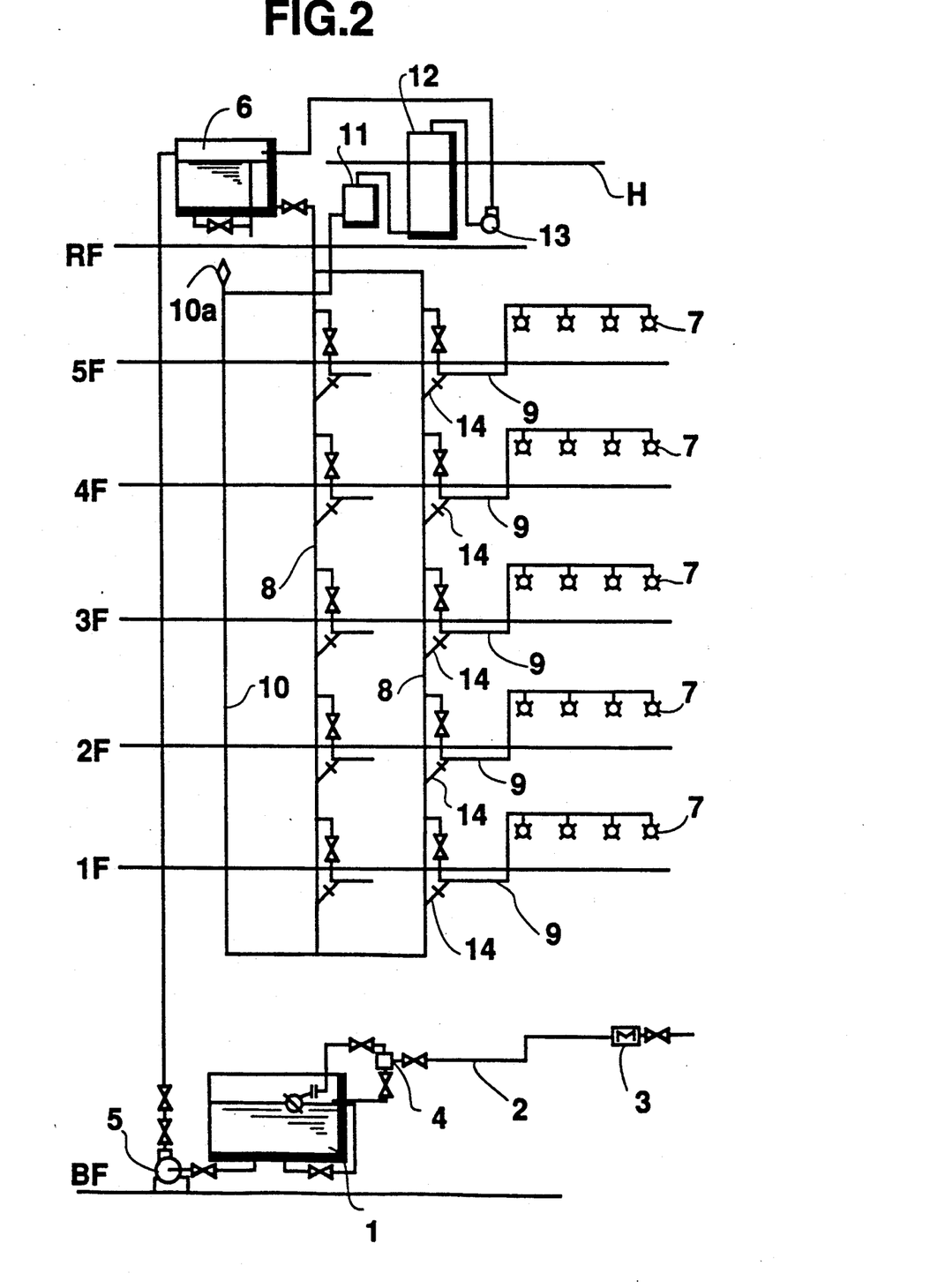
FIG. 2 is a schematic diagram of a first embodiment of a water supply system for a building construction according to the present invention.

Referring now to FIG. 2, there is shown a first embodiment of a water supply system for a building construction according to the present invention.

In this embodiment of a water supply system in a building construction, there is a receiving reservoir 1 for receiving water from an external water supply, located at a basement floor. The water from the external water supply will be deposited into the receiving reservoir through a pipe 2 which is equipped with a water gauge 3 for measuring an amount of the water coming into the receiving reservoir 1 and a water level valve 4 for adjusting the amount of water deposited into the receiving reservoir 1. There is also an upper reservoir 6 located at a roof floor into which the water deposited in the receiving reservoir 1 will be pumped by a water pump 5 associated with the receiving reservoir 1 and reserved there. The water reserved in the upper reservoir 6 will be led by gravity to individual water faucets 7 provided at each floor through which the water can be extracted. For this purpose, there is a main pipe 8 leading the water from the upper reservoir 6 down to the first floor, and sub pipes 9 leading the water from the main pipe 8 to the individual water faucets 7.

In addition, the main pipe 8 is connected at its bottom to a circulation pipe 10, which leads the water back to the upper reservoir 6, and which is equipped with an automatic ventilator 10a provided at a top floor (the fifth floor in FIG. 2), a water purifying filter 11 for circulated water, a water activating filter 12 and a compulsory circulation pump 13 provided at the roof floor. Furthermore, there are compulsory circulation joints 14 returning the water from the sub pipes 9 back to the main pipe 8, so as to reinforce the water circulation.

Figure 3:
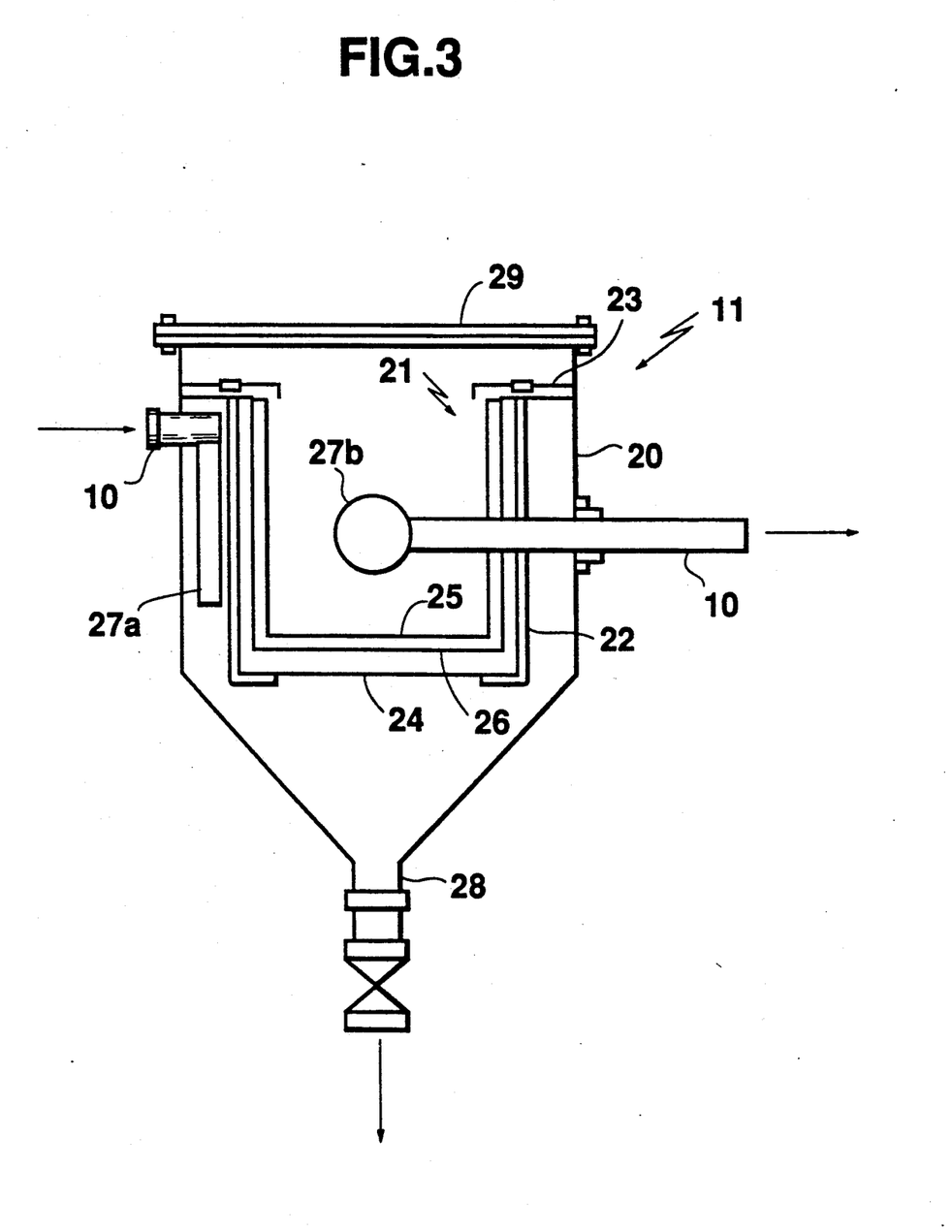
FIG. 3 is a cross sectional view of a water purifying filter for circulated water to be used in the embodiment of FIG. 2.

A detail of the water purifying filter 11 is shown in FIG. 3, which comprises a funnel-shaped casing 20 with its inner walls coated by a poly-vinyl chloride, having a drain 28 for draining filtered objects at its bottom and a lid 29 on its top, in which a filter box 21 is attached by means of a fixing member 22 and a filter box stopper 23. The filter box 21 further comprises stainless meshes 24 and 25 sandwiching a filter 26. In this water purifying filter 11, the water flows along the directions indicated by arrows in FIG. 3. Namely, the water in the circulation pipe 10 is led inside the casing 20 downwards along its inner wall by means of a perforated pipe 27a, and the water filtered through the filter 26 is returned to a further circulation pipe 10 through a water receptacle ball 27b.

Figure 4:
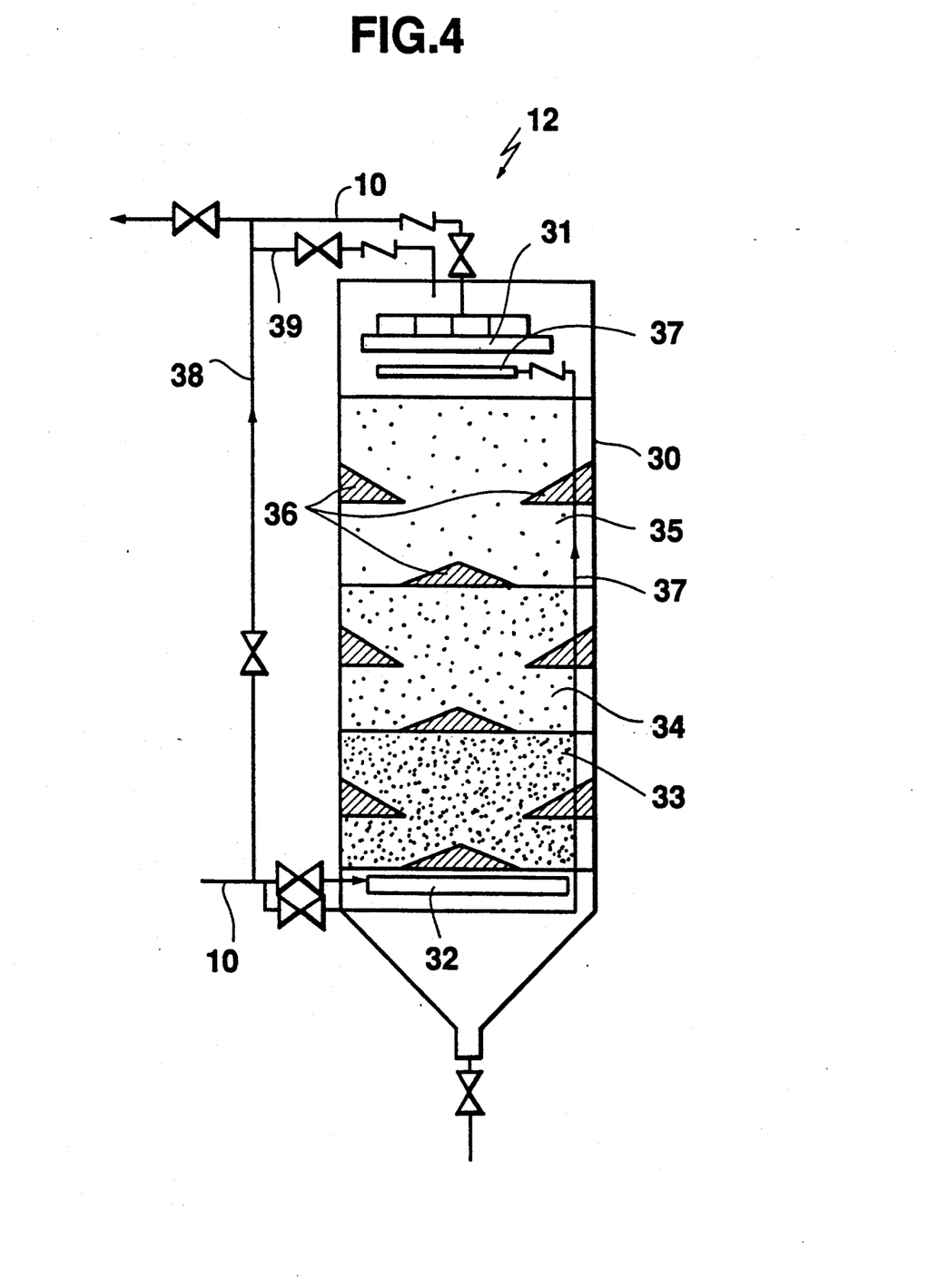
FIG. 4 is a cross sectional view of a water activating filter to be used in the embodiment of FIG. 2.

A detail of the water activating filter 12 is shown in FIG. 4, which comprises an elongated funnel-shaped casing 30 to which the circulation pipe 10 is connected through a perforated water reception pipe 31 located near its top side and a perforated water ejection pipe 32 located near its bottom side. Between the water reception pipe 31 and the water ejection pipe 32, inside the casing 30, there is a triple layer comprising a bottom layer 33 of a far-infrared radiation emitting ceramic, a middle layer 34 of 150 mm diameter quartz porphyry pieces, and a top layer of 80 mm diameter quartz porphyry pieces, through which the water in the circulation pipe 10 flows from the water ejection pipe 32 to the water reception pipe 31. Each of the bottom layer 33, middle layer 34, and the top layer 35 is equipped with obstacle plates 36 for preventing a straight flow of the water through each layer, so as to achieve a thorough filtration.

As is known, the far-infrared radiation from the bottom layer can activate molecular activities of the water, while the quartz porphyry has effects of supplying mineral components to the water and absorbing excessive chemical elements from the water. However, when this filtration by the water activating filter 12 is carried out too effectively, the chlorides in the water may also be filtered out more than generally considered desirable. For this reason, the water activating filter 12 is further equipped with a chloride retention pipe 37 which bypasses the water ejection pipe 32, bottom layer 33, middle layer 34, and the top layer 35, and leads the water in the circulation pipe directly to a vicinity of the water reception pipe 31 through a perforated water discharging pipe 37 located adjacent to the water reception pipe 31. In addition, there is also an external bypass pipe 38 bypassing the water activating filter 12 altogether, which has a branch pipe 39 connecting the vicinity of the water reception pipe 31 with the external bypass pipe 38. This external bypass pipe 38 is primarily to be used during maintenance operation of the water activating filter 12, but can also be utilized for retaining of the chloride in the water in addition to the chloride retention pipe 37.

As for the compulsory circulation pump 13, since the circulation pipe 10 is connected with the main pipe 8, the water inside the circulation pipe 10 automatically reaches a water level H of the water in the upper reservoir 6, so that the compulsory circulation pump 13 is required to have a power sufficient to overcome a sum of resistances due to the main pipe 8, sub pipes 9, circulation pipe 10, water purifying filter 11, and water activating filter 12.

Each of the compulsory circulation joints 14 can be implemented in various configurations, of which examples are shown in FIGS. 5 to 8, where elements playing the equivalent roles are labeled by the same reference numerals in the figures. Accordingly, the following description will be given for a representative embodiment of FIG. 5 alone. Also, in FIGS. 5 to 8, the directions of the water flow are indicated by arrows.

Figure 5:
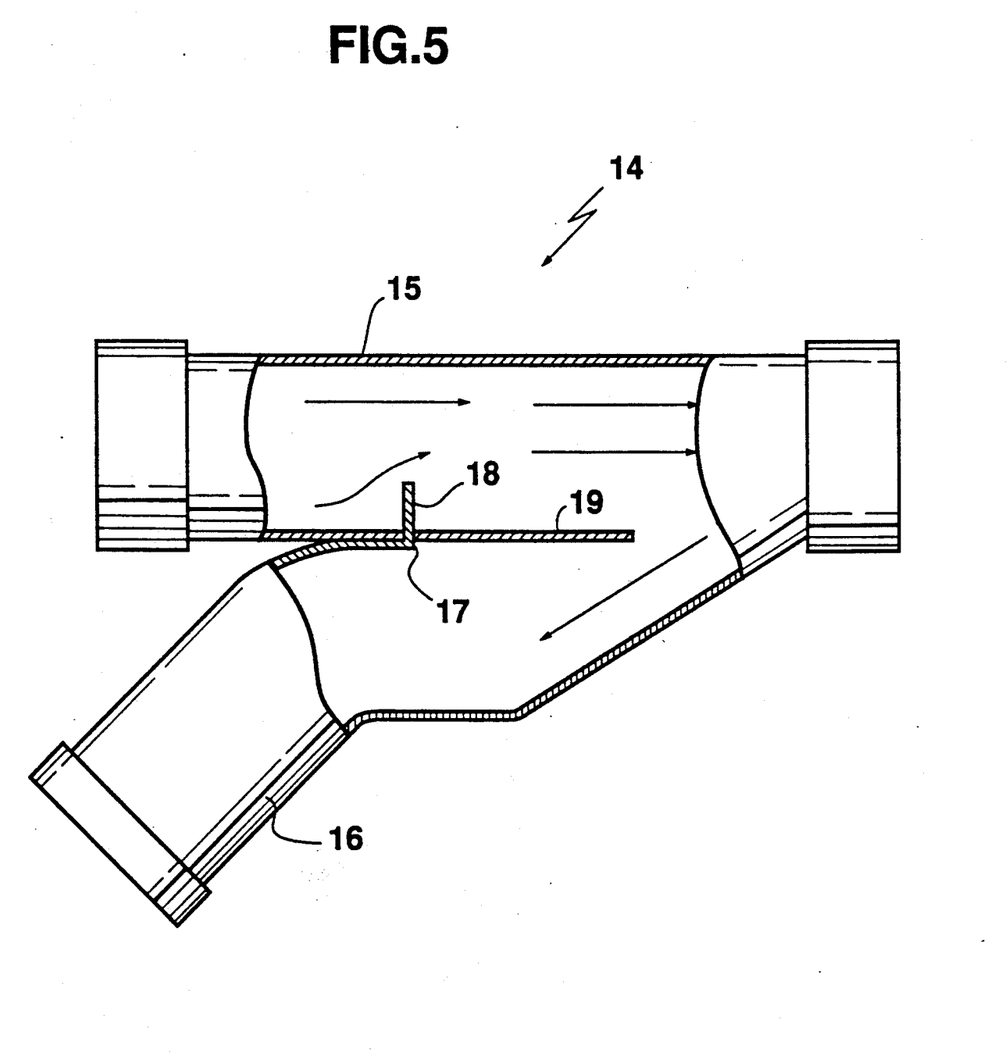
FIG. 5 is a cross sectional view of a first embodiment of a compulsory circulation joint to be used in the embodiment of FIG. 2.
Figure 6:
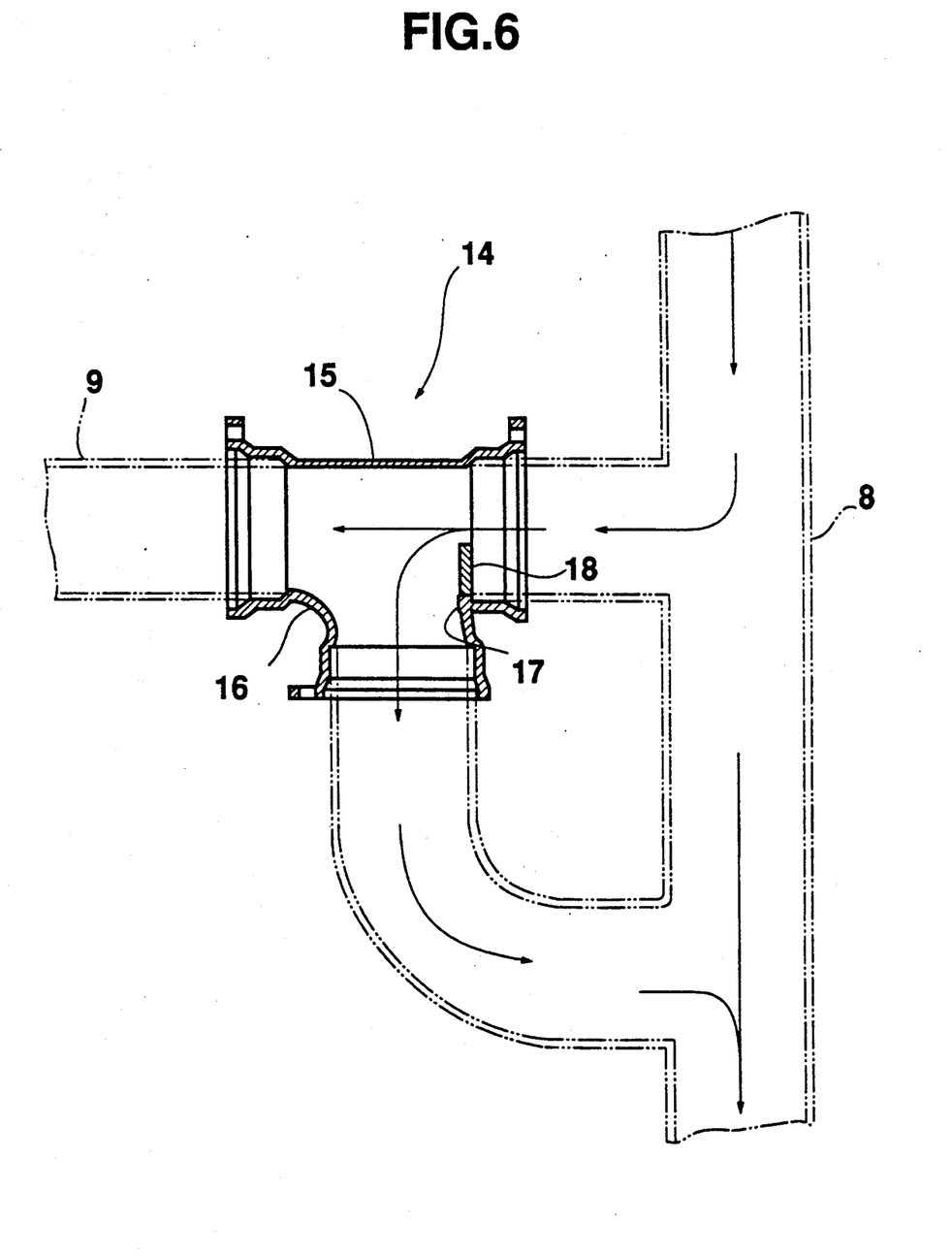
FIG. 6 is a cross sectional view of a second embodiment of a compulsory circulation joint to be used in the embodiment of FIG. 2.
Figure 7:
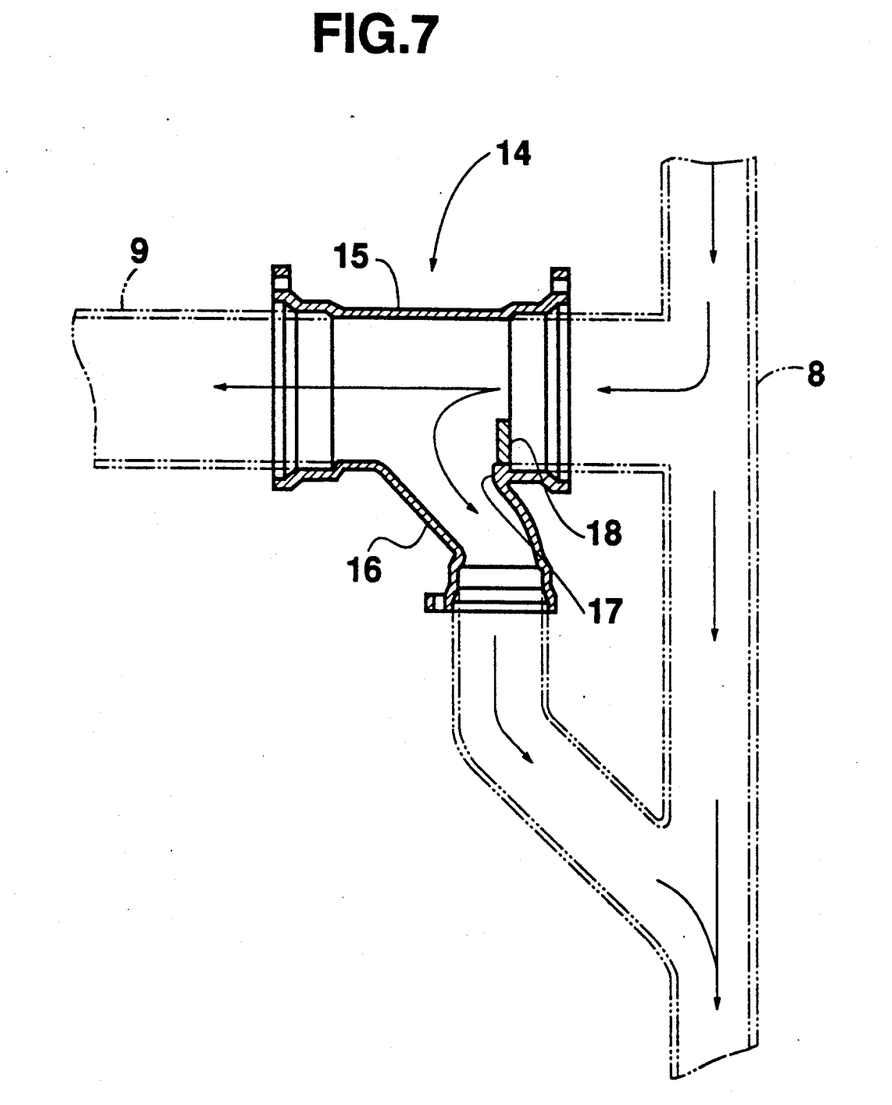
FIG. 7 is a cross sectional view of a third embodiment of a compulsory circulation joint to be used in the embodiment of FIG. 2.
Figure 8:
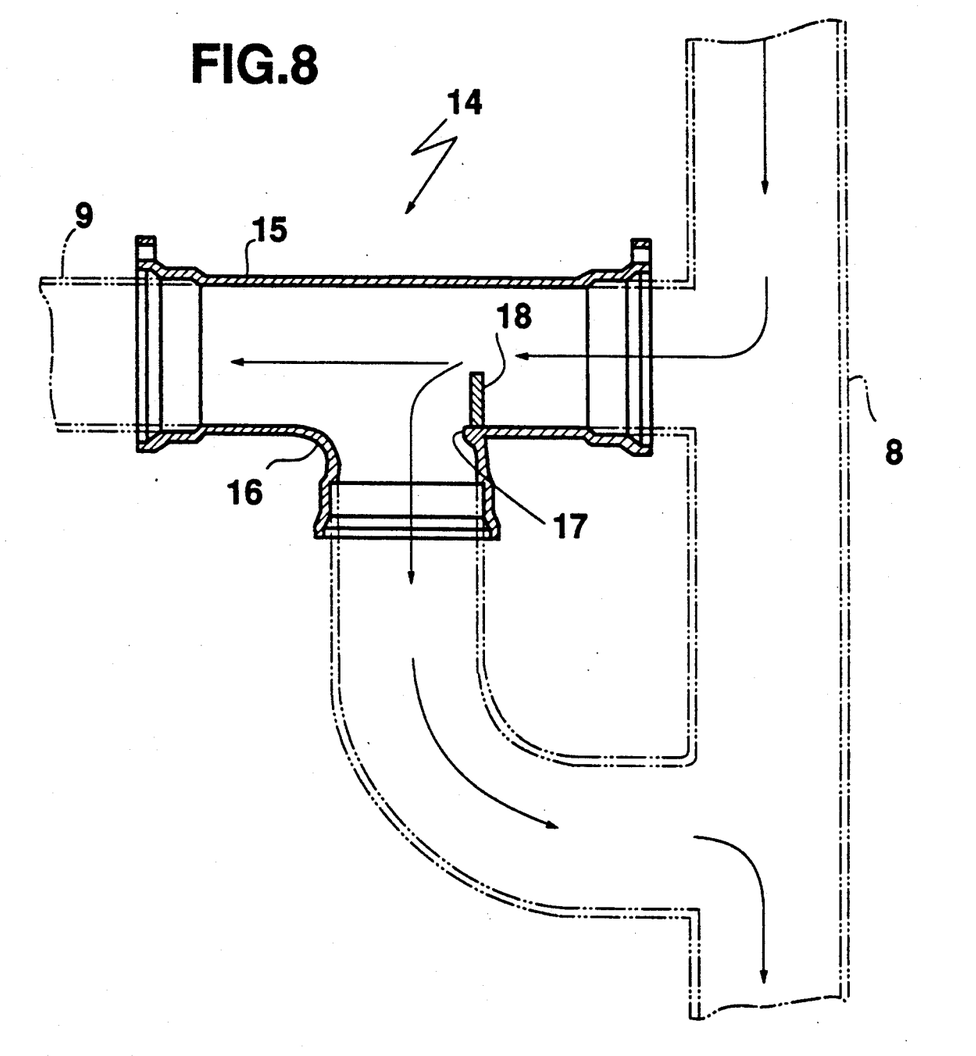
FIG. 8 is a cross sectional view of a fourth embodiment of a compulsory circulation joint to be used in the embodiment of FIG. 2.

In FIG. 5, the compulsory circulation joint 14 comprises a main path 15 to be incorporated in the sub pipe 9 and a branch path 16 branching from the main path 15 and returning the water to the main pipe 8, both of the same diameter. In FIG. 5, the branch path 16 is shown to have a meandering shape, but this feature can be modified, as can be seen from FIGS. 6 to 8. In addition, at a branch point 17 which is a point at a root of the branch path 16 closest to the main pipe 8 from which the water is flowing in, there is a path narrowing plate 18 which covers approximately one third of the diameter of the main path 15. Furthermore, the configuration of FIG. 5 incorporates a flow adjusting plate 19 which covers a part of the diameter of the branch path 16, in conjunction with the shape of the branch path 16. Because of such a configuration, the water passing through the path narrowing plate 18 will become jet-flow having a faster flow speed than that in the branch path 16, so that the constant amount of water returning through the branch path 16 can be obtained.

Thus, according to this embodiment, it is possible to provide a method and a system of water supply for a building construction capable of preventing the deterioration of the water quality even when the water is not extracted over an extended period of time, since the water can constantly be circulated, purified, and activated.

Figure 9:
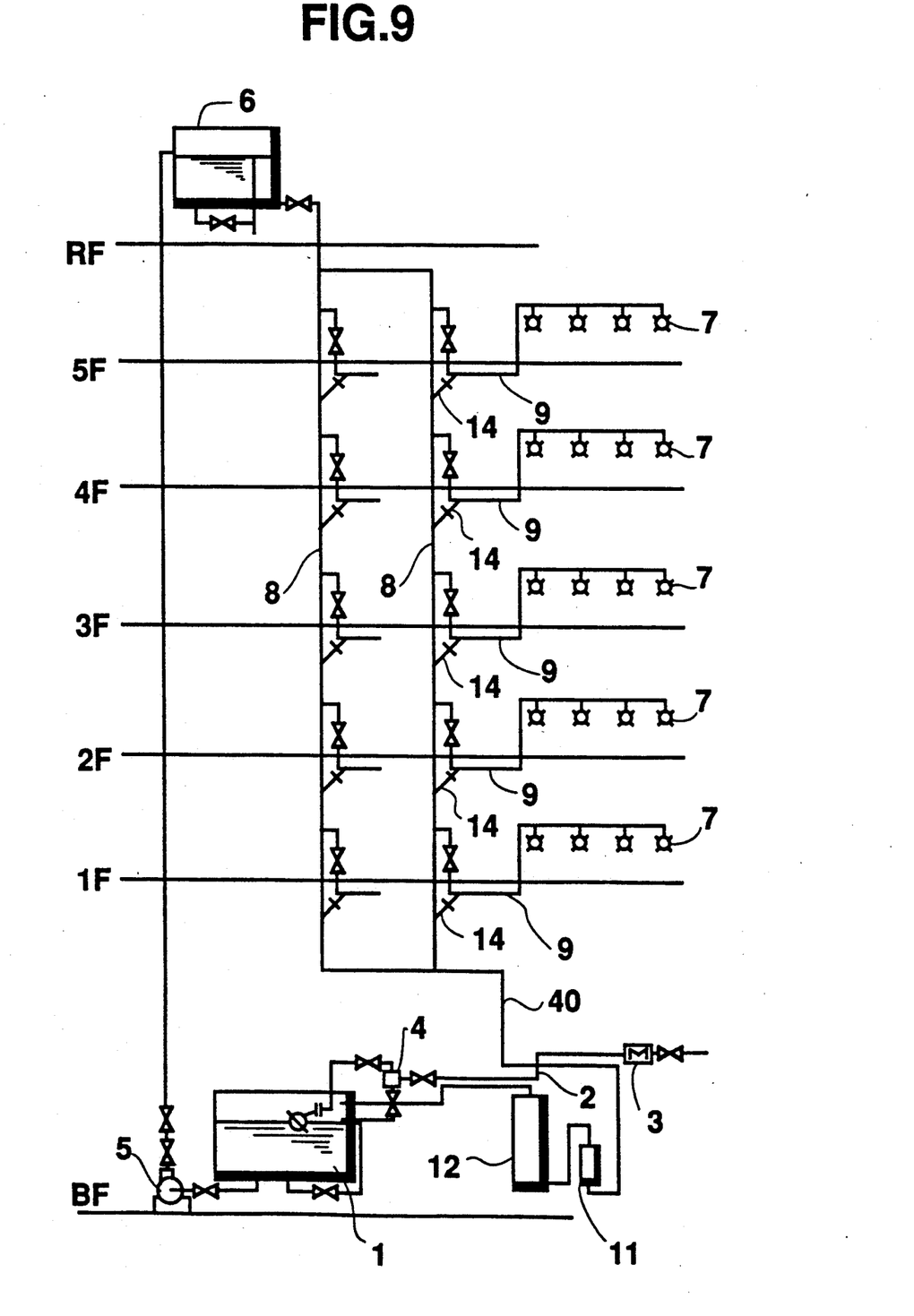
FIG. 9 is a schematic diagram of a second embodiment of a water supply system for a building construction according to the present invention.
Figure 10:
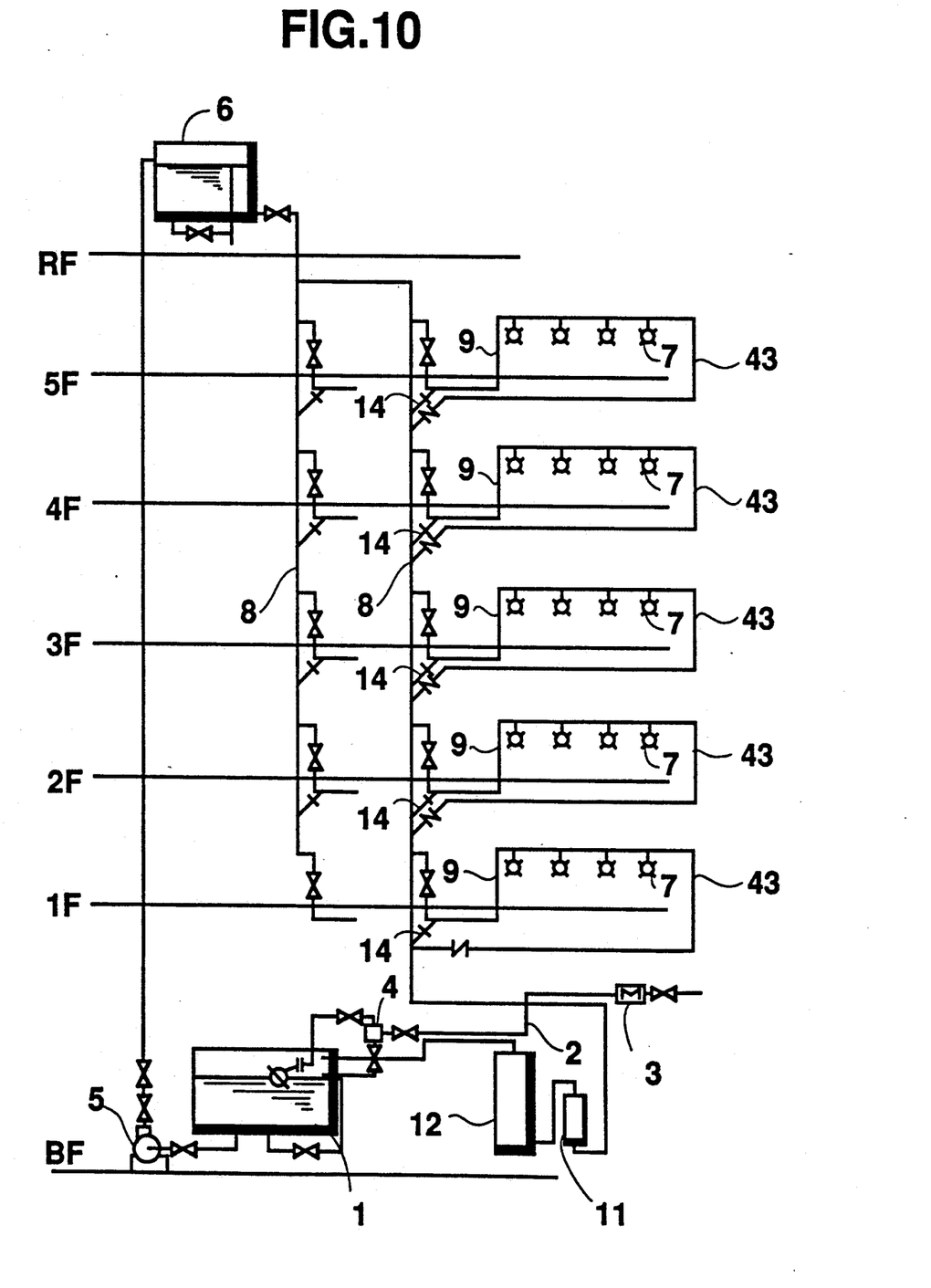
FIG. 10 is a schematic diagram of a third embodiment of a water supply system for a building construction according to the present invention.
Figure 11:
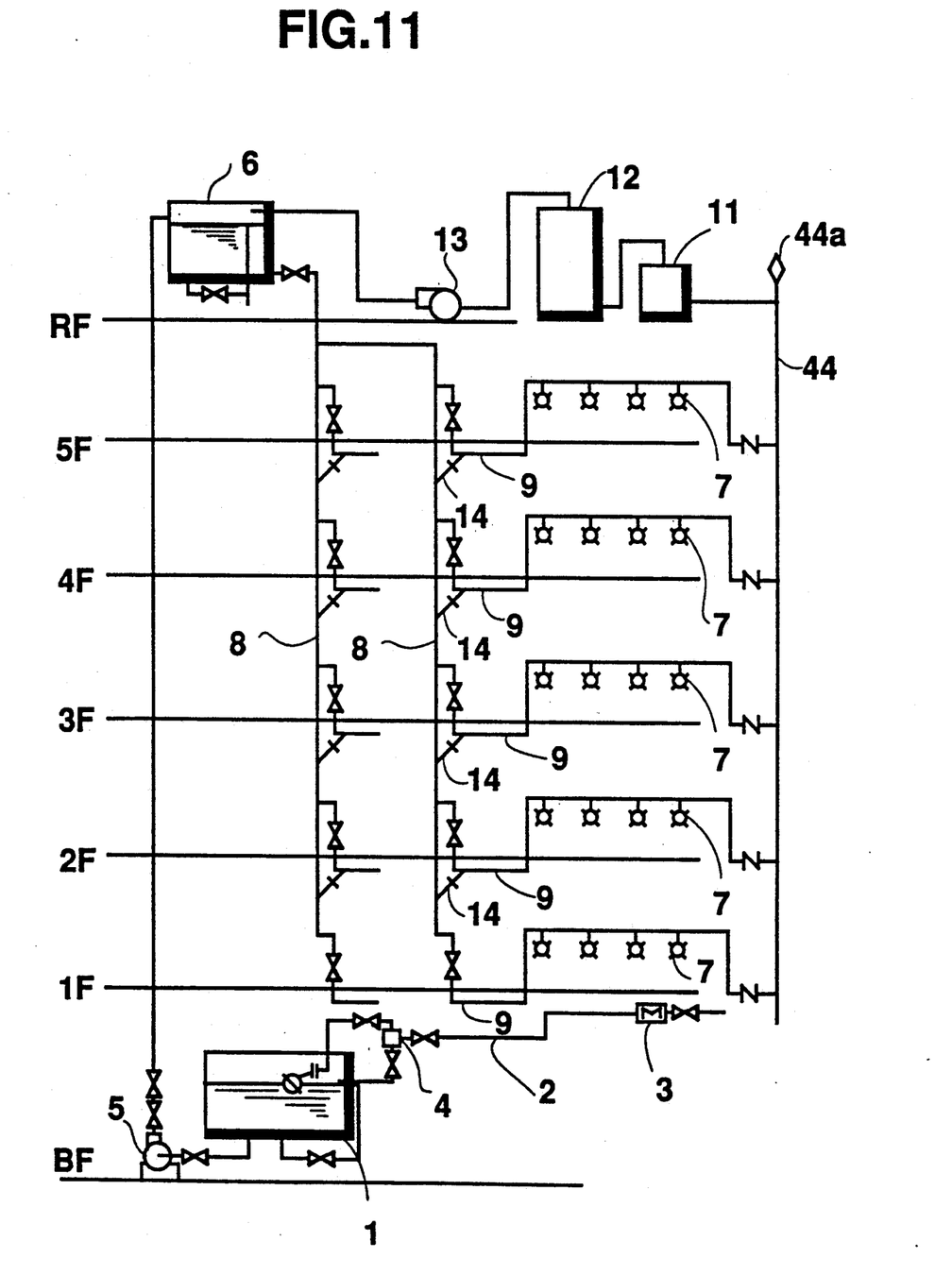
FIG. 11 is a schematic diagram of a fourth embodiment of a water supply system for a building construction according to the present invention.

The water supply system for a building construction according to the present invention can also be implemented in various configurations other than that of the first embodiment of FIG. 2, of which examples are shown in FIGS. 9 to 11, where those elements playing the equivalent roles to the corresponding feature of the first embodiment of FIG. 2 are labeled by the same reference numerals in the figures.

In an embodiment of FIG. 9, the water purifying filter 11 and the water activating filter 12 are brought down to the basement floor in order to be connected in the circulation pipe 40 which is leading the water from the bottom of the main pipe 8 back to the receiving reservoir 1, while the automatic ventilator 10a and the compulsory circulation pump 13 in FIG. 2 are removed as they are not necessary. It is obvious that the similar advantages as described above for the first embodiment of FIG. 2 are also obtainable by this embodiment of FIG. 9, since the water can constantly be circulated, purified, and activated, just as in the first embodiment of FIG. 2.

In an embodiment of FIG. 10, there are a main circulation pipe which is leading the water from the bottom of the main pipe 8 back to the receiving reservoir 1, and sub circulation pipes 43 which are leading the water from the individual faucet 7 back to the main pipe 8 and the main circulation pipe. As in the previous embodiment of FIG. 9, the automatic ventilator 10a and the compulsory circulation pump 13 in FIG. 2 are not provided as they are not necessary. Again, it is obvious that the similar advantages as described above for the first embodiment of FIG. 2 are also obtainable by this embodiment of FIG. 9, since the water can constantly be circulated, purified, and activated, just as in the first embodiment of FIG. 2.

In an embodiment of FIG. 11, there is a circulation pipe 44 which is leading the water from the individual faucet 7 back to the upper reservoir 6 which is equipped with an automatic ventilator 44a. Once again, it is obvious that the similar advantages as described above for the first embodiment of FIG. 2 are also obtainable by this embodiment of FIG. 9, since the water can constantly be circulated, purified, and activated, just as in the first embodiment of FIG. 2.

Besides these, many modifications and variations of the above embodiments may be made without departing from the novel and advantageous features of the present invention. Accordingly, all such modifications and the variations are intended to be included within the scope of the appended claims.

What is claimed is:

1. A system of water supply for a building construction, comprising:
   a receiving reservoir for receiving water externally supplied to the building construction;
   an upper reservoir located above the receiving reservoir for reserving the water received by the receiving reservoir;
   water supply pipes leading the water from the upper reservoir to individual faucets located between the receiving reservoir and the upper reservoir from which the water can be extracted;
   means for circulating the water in the water supply pipes by returning the water back to one of the receiving reservoir and the upper reservoir; and
   water activating filter means for activating the water circulated by the circulating means, having a layer of quartz porphyry pieces and a layer of a far-infared radiation emitting ceramic, and incorporating a bypass passage for subjecting only part of the water circulated by the circulating means to flow through the layer of quartz porphyry pieces and the layer of a far-infared radiation emitting ceramic, while subjecting the remaining part of the water circulated by the circulating means to bypass the layer of quartz porphyry pieces and the layer of far-infared radiation emitting ceramics.

2. The system of claim 1, further comprising water purifying filter means for purifying the water circulated by the circulating means.

3. The system of claim 1, further comprising compulsory circulation joint means for locally returning the water flowing towards the individual faucets back to the water supply pipes, which includes means for turning the flow of the water into a jet flow at a branch point at which the water flow is divided.

4. A method of water supply for a building construction, comprising the steps of:
   receiving water externally supplied to the building construction by a receiving reservoir;
   reserving the water received by the receiving reservoir by an upper reservoir located above the receiving reservoir;
   supplying the water through the water supply pipes leading the water from the upper reservoir to individual faucets located between the receiving reservoir and the upper reservoir from which the water can be extracted;
   circulating the water in the water supply pipes by returning the water back to one of the receiving reservoir and the upper reservoir; and
   activating the water by water activating filter means having a layer of quartz porphyry pieces and a layer of a far-infared radiation emitting ceramics, in which only a part of the water circulated by the circulating means is subjected to flow through the layer of quartz porphyry pieces and the layer of a far-infared radiation emitting ceramic, while the remaining part of the water circulated by the circulating means is subjected to bypass the layer of quartz porphyry pieces and the layer of far-infared radiation emitting ceramic.

5. The method of claim 4, further comprising the step of purifying the water by water purifying filter means.

6. The method of claim 4, further comprising the step of reinforcing the circulation of the water by compulsory circulation joint means for locally returning the water flowing towards the individual faucets back to the water supply pipes, which includes means for turning the flow of the water into a jet flow at a branch point at which the water flow is divided.

* * * * *